July 23, 1957 — A. L. WALL — 2,800,204
AUTOMATIC TRAILER HITCH BRAKE MECHANISM
Filed Feb. 23, 1955 — 3 Sheets-Sheet 1
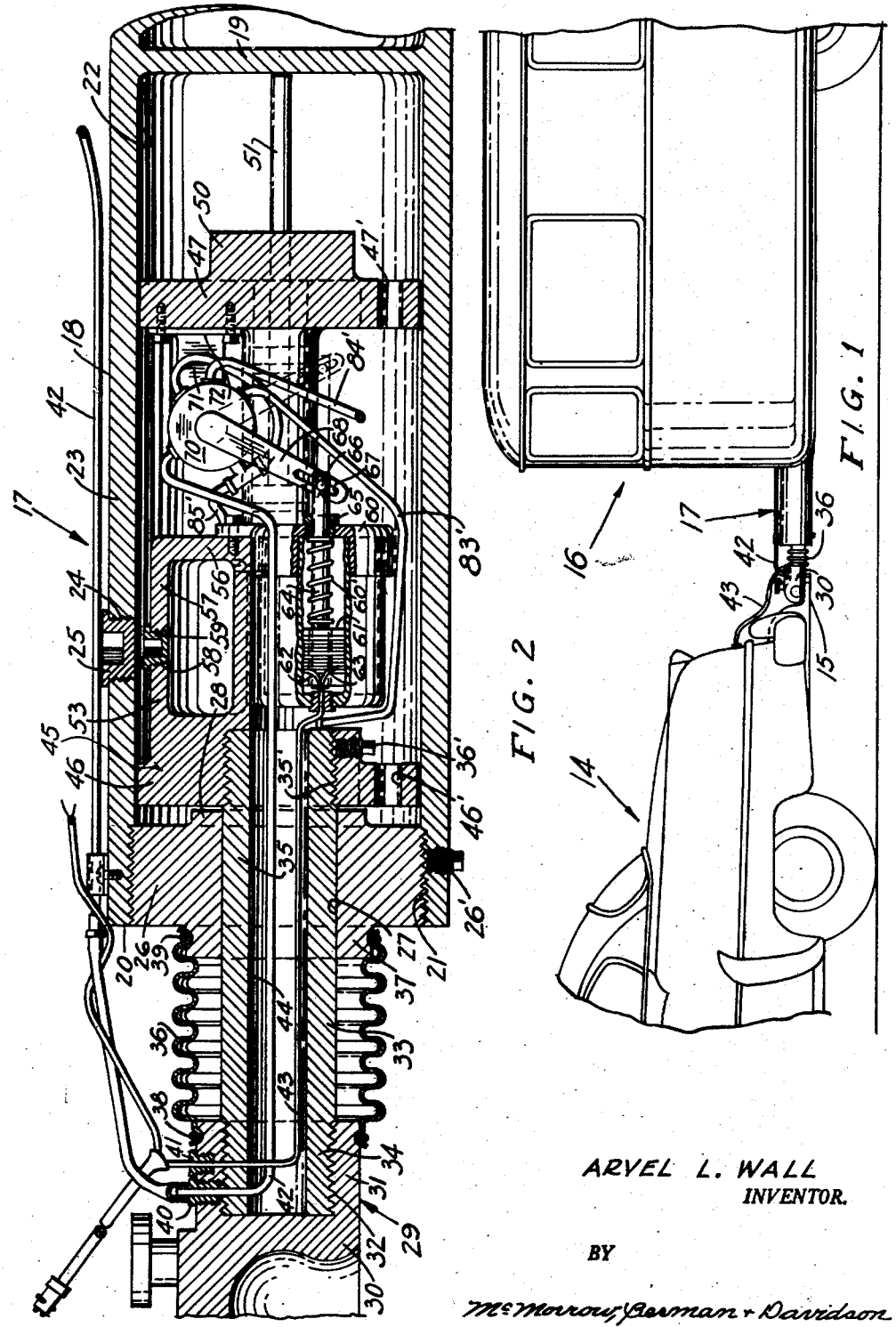
ARVEL L. WALL
INVENTOR.
BY
McMorrow, Berman & Davidson
ATTORNEYS

ARVEL L. WALL
INVENTOR.

BY
McMorrow, Berman + Davidson
ATTORNEYS

July 23, 1957          A. L. WALL          2,800,204
AUTOMATIC TRAILER HITCH BRAKE MECHANISM
Filed Feb. 23, 1955          3 Sheets-Sheet 3
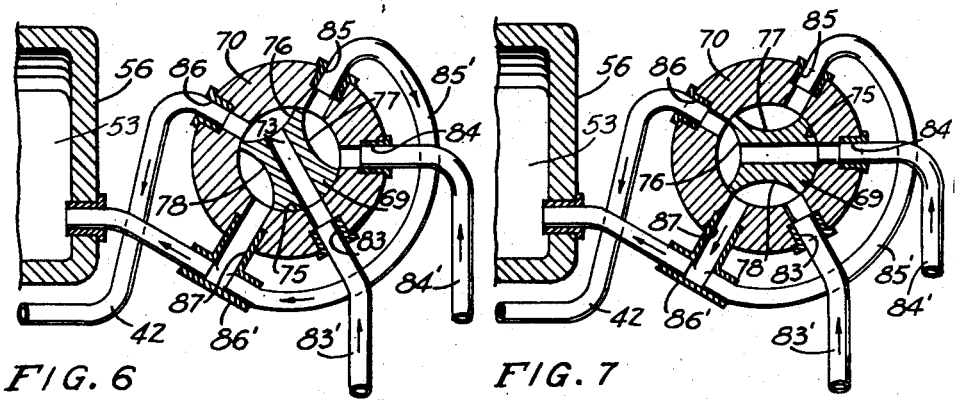
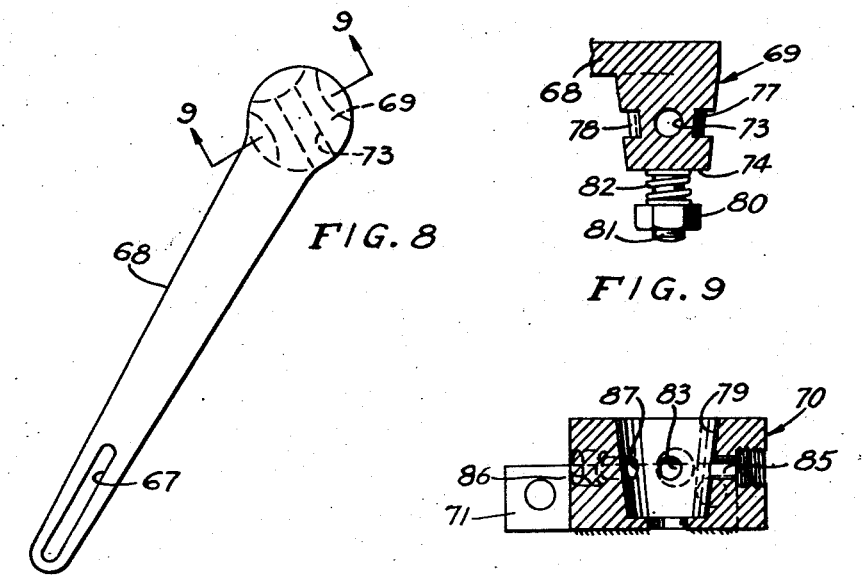
ARVEL L. WALL
INVENTOR.
BY
McMorrow, Berman + Davidson
ATTORNEYS United States Patent Office 2,800,204
Patented July 23, 1957

2,800,204
AUTOMATIC TRAILER HITCH BRAKE MECHANISM

Arvel L. Wall, Bay, Ark.

Application February 23, 1955, Serial No. 489,970

4 Claims. (Cl. 188—112)

The invention relates to automatic hydraulic braking mechanism for trailers.

The primary object of the invention is to provide separate hydraulic brake mechanism for trailers which is automatically operated, in both forward and backward travel of an associated towing vehicle without attention from or action by the operator of the towing vehicle, and is shock-absorbing in both directions of travel.

A further object of the invention is to provide mechanism of the character indicated above which is automatically controlled in its operation in either direction of towing vehicle travel by energization and de-energization of the electric backup light circuit of the towing vehicle.

A still further object of the invention is to provide mechanism of the character indicated above which enables the trailer brake mechanism to be locked while the trailer is parked; and wherein a short in the back-up light circuit does not interfere with application of the braking mechanism in forward travel of the towing vehicle and trailer.

Another important object of the invention is to provide long life, efficient, practical and reliable braking mechanism of the character indicated above which can be easily installed on a trailer and requires no special hitch structure on a towing vehicle.

Still another object of the invention is to provide mechanism of the character indicated above which is simple in construction and composed on relatively few parts which are easily assembled, the parts of the mechanism being constantly and adequately lubricated.

Other important objects and advantageous features of the invention will be apparent from the following description and the accompanying drawings, wherein, for purposes of illustration only, a specific embodiment of the invention is set forth in detail.

Figure 1 is a fragmentary left-hand side elevation of a towing vehicle and a trailer, the trailer being hitched to the towing vehicle by mechanism in accordance with the present invention;

Figure 2 is an enlarged fragmentary vertical longitudinal section through said mechanism showing the moving parts adjacent the front end of the housing or outer cylinder or the positions they occupy when the towing vehicle is pulling the trailer in a forward direction;

Figure 6 is a fragmentary schematic and section view showing the control valve in position to operate the mechanism in forward travel of the trailer;

Figure 7 is a view similar to Figure 6 showing the control valve in position to operate the mechanism when the trailer is being backed up;

Figure 8 is an enlarged side elevation of the valve core lever, with the valve core in phantom lines;

Figure 9 is a fragmentary horizontal section taken through the valve core; and

Figure 10 is a horizontal section taken through the valve body with the core removed.

Figure 3:
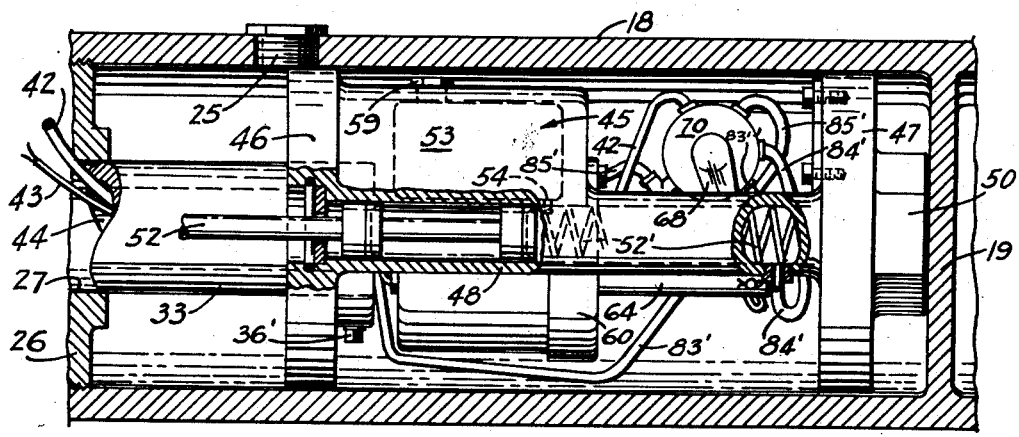
Figure 3 is a view similar to Figure 2 from the same side of the device, with the housing or outer cylinder broken away, and with the moving parts adjacent the back end of the housing or outer cylinder and the valve core lever carrying the valve core in position in the valve body for the backing up operation or the positions when the trailer is being backed up by the towing vehicle.

Referring in detail to the drawings, wherein like numerals designate like parts throughout the several views, the numeral 14 generally designates a towing vehicle, such as a passenger car, having a rearwardly projecting ball hitch 15, the numeral 16 generally designates a trailer, and the numeral 17 generally designates the illustrative device of the present invention, connecting the trailer 16 to the ball hitch 15. The device 17 is fixed to the trailer 16 in any suitable manner, and projects forwardly from the trailer.

The device 17 comprises an outer main cylinder or housing 18 having a closed rear end 19, and an open forward or front end 20 which is internally threaded, as indicated at 21. The cylinder 18 has a uniform bore 22, and is provided in the top of its side wall 23, with a filling opening 24, closed by a screw plug 25, and located near to but spaced rearwardly from the open forward end 20.

An externally threaded cylinder head or front bearing 26 is threaded into the open forward end of the main cylinder 18 and has a smooth central bore 27 extending therethrough. The rear side of the bearing 26 has a rearwardly projecting, relatively small diameter boss 28 which acts as a spacing stop for the main or tongue piston as hereinafter described. The head 26 is locked in place by a screw 26' traversing the main cylinder 18.

A hitch tongue, generally designated 29, comprises a socket 30 which receives the towing vehicle ball hitch 15, in a usual manner. The socket 30 has a rearward extension 31 which has a rearwardly opening threaded socket 32. A tubular shaft 33 which slides through the bore 27 of the main cylinder head or bearing 26 has a threaded forward end 34 which is threaded into the socket 32, and a threaded rear end 35 which is located rearwardly of the head 26.

A tubular flexible, preferably rubber, accordion shield 36 spacedly surrounds the shaft 33 and has its opposite ends removably secured to the socket extension 31 and to a boss 37 on the front of the main cylinder 26 by spring rings 38 and 39, respectively.

Through plugs 40 and 41 traversing the socket extension 31 and the forward end of the shaft 33, a brake line 42 and a towing vehicle electric back-up light circuit conduit 43, respectively, enter the bore 44 of the tubular shaft 33.

Working within the housing or main cylinder 18 is a main or tongue piston which comprises two similar, longitudinally spaced front and rear piston heads 46 and 47, respectively, which are spaced and connected by two longitudinally and horizontally extending left- and right-hand brake master cylinders 48 and 49, respectively. The brake master cylinders are of relatively small diameter, are in the same horizontal plane, and are equally spaced on opposite sides of the axis of the main piston 45. The tongue shaft 33 is threaded at its rear end into the front master piston head 46, as indicated at 35', and locked by a set screw 36'.

The rear piston head 47 has a boss 50 on its rear side, and at one side of the boss 50 is traversed by the right-hand master cylinder piston rod 51 which extends rearwardly beyond the rear piston head 47 for engagement with the closed end 19 of the main cylinder 18.

The forward main piston head 46 is similarly traversed by the left-hand master cylinder piston rod 52 which extends forwardly beyond the forward main piston head 46 for contact with the main cylinder head 26. Each of the master cylinder pistons 51 and 52 has a conventional and individual return spring 51', 52', respectively, which acts in the usual manner to return the pistons to their starting positions from compressed positions.

Mounted on the upper sides of the brake master cylinders 48 and 49 and extending therebetween is an arcuate, semicylindrical excess brake fluid tank 53 which is in free and direct but restricted communication with the master cylinders solely through holes 54 and 55, at points substantially midway between the master piston heads 46 and 47. The excess fluid tank 53 has a rear wall 56 which is spaced forwardly from the rear main piston head 47, and a top wall 57 which is provided with a fillling opening 58 which is in register with the main cylinder filling opening 24 when in the position shown in Figure 2, and is closed by a screw plug 59, the plugs 25 and 59 preferably having breather openings.

Positioned between and suspended from the master cylinder and excess brake fluid structure is an electric solenoid casing 60 which encloses a longitudinal horizontal solenoid coil 61, to which two conductor wires 62 and 63 of the conduit are connected, the conduit entering the front end of the casing 60. As solenoid core 64 works in the coil 61 and through a packing nut 65 mounted in the rear end of the solenoid casing 60. A helical return spring 60' surrounds the core 64 and is compressed between the coil 61 and the packing nut 65.

A pivot pin 66 traverses the rear end of the core 64 and extends through a vertical slot 67 in the lower part of a vertical valve core lever 68 having on its upper end a lateral valve core 69 which is rotatable engaged in a valve body 70 which has a bracket 71 secured, as indicated at 72, to the right-hand side of an upper part of the forward side of the rear main piston head 47.

The valve core 69 and valve body 70 constitute the control valve of the device, and the position of the core 69 in the body 70 determines the braking operation of the device in forward and rearward travel of the towing vehicle and trailer.

The valve core 69 is axially tapered away from the lever 68 and has a diametrical transverse passage 73 extending therethrough at a point intermediate the lever 68 and the smaller end 74 of the valve core 69. One end of the passage 73 opens through an unindented part 74 of the circumference of the core 69 while the other end of the passage 73 opens into a circumferential concavity 76. The concavity 76 is located between two similar concavities 77 and 78, the concavities being equally circumferentially spaced from each other.

The valve body 70 comprises a cylindrical block having an axial tapered chamber 79 extending therethrough in which the core 69 rotatably fits. When the core is in place in the chamber 79, a nut 80 on a stud 81 projecting from the core compresses a helical spring 82 on the stud 81 against the adjacent end of the core body 70 and retains the core 69 in place.

As shown in Figures 6 and 7, the valve body 70 has circumferentially spaced radial ports, which include adjacent ports 83 and 84, the port 83 being connected by a tube 83' to the forward end of brake master cylinder 49 and the port 84 being connected by a tube 84' to the rearward end of brake master cylinder 48.

Spaced counterclockwise around the valve body 70 from the ports 83 and 84 are the ports 85, 86 and 87. The port 85 is connected by a tube 85' to the lower part of the excess fluid tank 53 through the rear wall thereof. The port 86 is connected to the brake line 42 which extends forwardly through the tubular shaft 33, and connects with the trailer brakes (not shown).

The port 87 is connected by a T-fitting 86' in communication with the tube 85'.

The main piston heads 46 and 47 have in their lowermost portions, circumferentially spaced fluid transfer passages 46' and 47', respectively.

Figure 4:
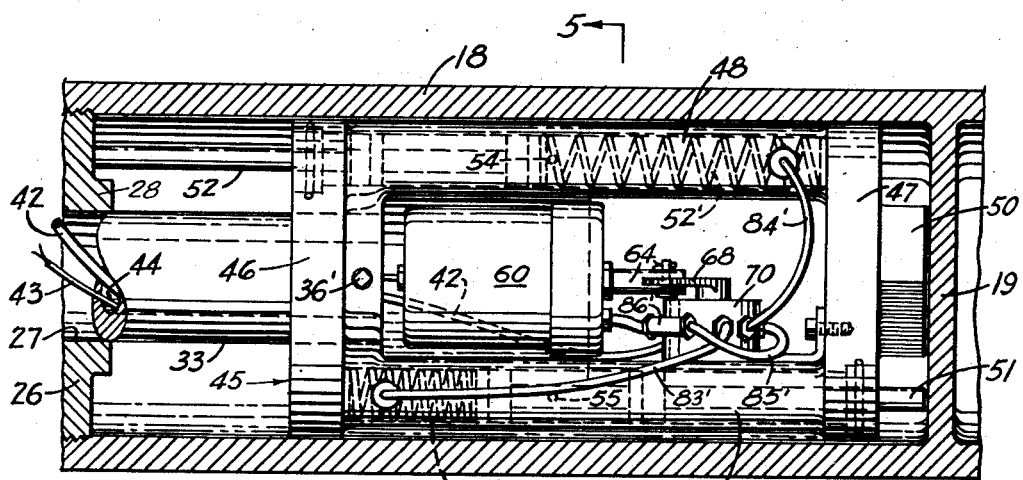
Figure 4 is a bottom view of the assembly of Figure 3, but showing the valve core lever carrying the valve core moved to a position in the valve body for forward movement of the towing vehicle.
Figure 5:
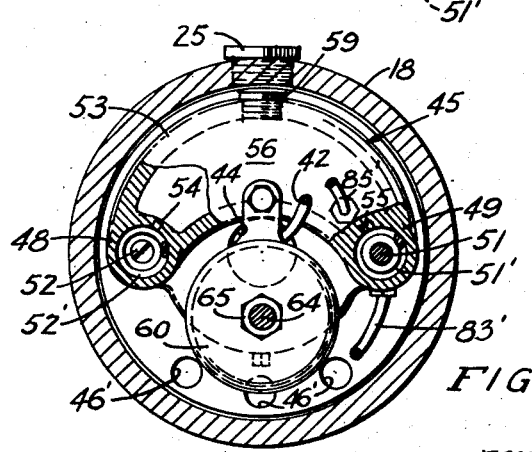
Figure 5 is a transverse vertical section taken on the line 5—5 of Figure 4.

It will appear from the foregoing that with the main piston 45 in position adjacent the rear end of the main cylinder 18, as exemplified in Figures 3 and 4 of the drawings, and there being oil in the main cylinder 18 and brake fluid in the excess fluid tank 53 and in the brake master cylinders 48 and 49 ahead of their pistons, a forward pull by the towing vehicle 14 relative to the trailer 16 will be transmitted by the tubular shaft 33 to the main piston 45 which will move the main piston 45 forwardly in the main cylinder 18, due to the inertia of the trailer 16, until the forward side of the main piston head 46 engages against the main cylinder head boss 28 and there is established a direct mechanical connection between the towing vehicle 14 and the trailer 16. In this movement of the main piston oil transfer takes place through the transfer passages 46' and 47' of the main piston heads.

Whenever in this position of the main piston 45 the brakes of the towing vehicle 14 are applied, the momentum of the trailer 16 causes it to over-ride the towing vehicle 14, with the result that the main piston 45 is started rearwardly in the main cylinder 18. Brake fluid immediately begins to flow to the wheel cylinder from the master cylinder 49. The control valve core 69 is positioned as shown in Figure 6 of the drawings.

As rearward movement of the main piston 45 begins the rearwardly projecting piston rod 51 of the right-hand brake master cylinder 49 moves forwardly relative to the main piston 45 and thereby compresses brake fluid in the master cylinder 49 and the brake fluid pressure is transmitted through the tube 83' to the brake line 42 through the control valve, thereby applying the brakes of the trailer 16. This action of the master cylinder piston rod 51 on the brake fluid in its cylinder 49 has a wanted shock-absorbing effect which cushions the relative movement of the towing vehicle 14 and the trailer 16 which effect also relieves strain on the hitch mechanism and precludes harsh contact between its components.

Then, when the towing vehicle 14 resumes forward movement, the main piston 45 is pulled forwardly, the forwardly projecting piston rod 52 of the left-hand brake master cylinder 48 remains in contact with the main cylinder head 26, is push rearwardly and compresses brake fluid in the brake master cylinder 48, so that the forward movement of the main piston is cushioned until the main piston 45 resumes contact with the main cylinder head 26. This rearward movement of the brake master cylinder piston rod 52 transfers brake fluid through the control valve to the excess fluid tank 53, from which brake fluid flows gravitationally as an incident to this transfer through the holes 54 and 55, keeping both master cylinders full at all times.

Rearward braking

When the trailer is in a stopped position and the towing vehicle is put in reverse gear, this turns on the automatic conventional back-up light circuit to which the coil 61 of the solenoid is connected. This energizes the coil 61 and solenoid core 64 moves and compresses coil spring 60' within solenoid housing 60 in the conventional manner. As solenoid core 64 moves rearwardly relative to tongue piston 45, it carries with it valve arm 68 by way of connection pin 66 in slot 67 and since valve core 69 is fastened rigidly to arm 68, it is turned from position in Figure 6 to position of Figure 7. Master cylinder 49 is now in communication with excess brake fluid tank 53; the brake fluid in master cylinder 49 will be forced out to excess brake fluid tank 53 by rearward movement of main tongue piston 45. This is what gives the shock-absorbing effect eliminating any jerk or noise as boss 50 comes to rest against rear of housing 19. The trailer is backed up where desired with the parts in this position. Master cylinder piston 52 working in brake master cylinder 48 was extended by means of the coil spring 52' in its chamber in a conventional manner as master cylinder piston 51 working in brake master cylinder 49 was being compressed. When rearward motion of towing vehicle stops and if the trailer continues to move rearwardly due to inertia, main housing 18 will move rearwardly relative to main piston 45 and this will cause master cylinder piston 52 working in brake master cylinder 48 to be compressed by force of main cylinder head 26 against piston rod 52. This will force brake fluid to the wheel cylinders of the trailer 16 without any appreciable tug or pull at the towing vehicle 14. The same process can be repeated if further backing is desired, since the valve 70 stays in this position. If forward motion is desired at this point, the towing vehicle is shifted to a forward gear. This will break the circuit to solenoid coil 61 which will de-energize the same and solenoid core 64 will return to starting position forced forwardly relative to main piston 45 by coil spring 60' on the core 64, and the valve will be turned back to starting position shown in Figure 6, which is the position for forward braking.

It is to be noted that when the trailer is being backed up, the parts have the positions shown in Figure 3, tongue piston 45 having moved rearwardly relative to the housing or main cylinder 18 until boss 50 on piston head 47 rests against end 19 of tongue housing 18. In this situation brake master cylinder piston rod 51 is compressed flush with the boss 50 by end of tongue cylinder 19. Master cylinder piston 52 projects forwardly due to the action of its return spring 52' and the forward end of the piston 52 rests against the cylinder head 26.

When the trailer is being backed, the towing vehicle is in reverse gear and the back-up light circuit is closed so that the solenoid coil 61 is energized and the arm 68 of valve 70 is moved rearwardly to the dotted line position of Figure 2 and the full line position of Figure 3 respectively, the resultant position of the valve core 69 being shown in Figure 7.

The control valve 70 has nothing to do with locking the trailer brakes when the trailer is parked. The locking is done by means of a simple cut-off valve (not shown) in the brake line 42. Locking the trailer brakes for parking is accomplished by disconnecting the trailer light plug which carries the current to the solenoid 60. The towing vehicle is then put in reverse gear and pressure against the trailer tongue will apply the trailer brakes. With the trailer brakes so applied, the cut-off valve is closed so as to trap the brake fluid present in the trailer brakes wheel cylinders, so that this fluid cannot bleed back ot the master cylinders even though the trailer is disconnected from the towing vehicle and no rearward pressure is exerted on the tongue.

It is not the purpose of the passages 46' and 47' to restrict the flow of fluid in the main cylinder 18, but these passages or ports should be large enough in diameter so that the main piston head 45 can move freely in the main cylinder 18. The viscosity of the oil in the main cylinder 18 is important, since a too heavy oil would restrict free movement of the main piston.

The desired shock-absorbing effect is obtained by the pressure of fluid behind the master cylinder piston 52 being forced out through the line 83' by way of the valve 70 into the excess fluid tank 53. As pressure is exerted against piston 52 by the main cylinder head 26 as main piston 45 moves forwardly in main cylinder 18, the fluid behind piston 52 has to flow out of its cylinder before the main piston head 46 can engage the boss. This prevents any sudden jerk and causes uniform movement under equal pulling force and provides the shock-absorbing effect. When the position of valve core 69 changes in valve housing 70, the master cylinders 48 and 49 merely reverse their functions.

It will be noted that only one of the master cylinder pistons 51 and 52 can be completely extended at any one time, and one is extended at the expense of the other. Any movement of the main piston 45 in either direction causes displacement of brake fluid in one of the master cylinders.

The cushioning of the force of the trailer 16 against the towing vehicle 14 is accomplished by the brake fluid pressure in the trailer wheel cylinders sufficient to apply the brakes on the trailer 16 sufficiently to keep the inertia of the trailer from exerting any appreciable force against the towing vehicle 14, and this desired action is obtained and takes place whether the trailer 16 and towing vehicle 14 are being stopped rapidly or gradually.

The control valve 70 never changes position when the trailer is stopped and resumes forward motion again. The master cylinder 48 stays in communication with the excess fluid tank 53. Master cylinder 48 does not force any brake fluid into master cylinder 49. The fluid forced to the trailer wheel cylinder must bleed back into master cylinder 49 before the brakes can release. Brake fluid in the trailer wheel cylinders is forced back to the master cylinders in the conventional manner.

What is claimed is:

1. In combination, a towing vehicle having a trailer hitch and an electrical back-up light circuit, a trailer having hydraulic brakes, a brake line leading to said brakes, brake operating mechanism fixed to said trailer and connected to said hitch, said mechanism comprising a stationary main member fixed to the trailer, a main movable member mounted on said stationary member for forward and rearward movements relative to said stationary member as the towing vehicle travels forwardly and rearwardly relative to the trailer, and a pair of brake master cylinders fixed on said movable main member, one of said brake master cylinders having a spring projected piston rod extending forwardly from said main movable member and the other brake master cylinder having a spring pressed piston rod extending rearwardly from said main movable member, conduit means connecting the brake master cylinders to said brake line, abutment means at opposite ends of said main stationary member with which one at a time of said piston rods engages and is compressed as said main movable member is moved forwardly or rearwardly relative to the main stationary member whereby the hydraulic brakes of the trailer are applied, a control valve interposed in said conduit means and movable to occupy positions in which said conduit means is out of communication with one of the brake master cylinders and in communication with the other brake master cylinder and out of communication with the other brake master cylinder and in communication with the one brake master cylinder, and means operatively connecting said valve to the back-up circuit so that the movements of said valve are responsive to the energization of said circuit.

2. In a trailer hydraulic braking mechanism, a main cylinder having a closed rear end, a bearing head closing the forward end of said main cylinder, a tongue shaft slidably traversing said bearing head and projecting forwardly beyond said bearing head, said tongue having a forward end arranged to be connected to a hitch on a towing vehicle and a rear end within said main cylinder, a main piston working in said main cylinder, said main piston comprising spaced front and rear piston heads and said rear end of the tongue being secured to said front piston head, a pair of laterally spaced brake master cylinders positioned between said front and rear piston heads, one of said brake master cylinders having a spring projected piston rod extending forwardly beyond said front piston head for operative engagement with the main cylinders bearing head and the other brake master cylinder having a spring pressed piston rod extending rearwardly beyond said rear main piston head for operative engagement with the closed end of the main piston, a brake line leading to hydraulic brakes on the trailer, conduit means connecting the brake line to the brake master cylinders, a control valve interposed in said conduit means, a control valve interposed in said conduit means and movable to occupy positions in which said conduit means is out of communication with one of the brake master cylinders and in communication with the other brake master cylinder and out of communication with the other brake master cylinder and in communication with the one brake master cylinder, and operating means connected to said valve for effecting the movements of the latter.

3. In a trailer hydraulic braking mechanism, a main cylinder having a closed rear end, a bearing head closing the forward end of said main cylinder, a tongue shaft slidably traversing said bearing head and projecting forwardly beyond said bearing head, said tongue having a forward end arranged to be connected to a hitch on a towing vehicle and a rear end within said main cylinder, a main piston working in said main cylinder, said main piston comprising spaced front and rear piston heads and said rear end of the tongue being secured to said front piston head, a pair of laterally spaced brake master cylinders positioned between said front and rear piston heads, one of said brake master cylinders having a spring projected piston rod extending forwardly beyond said front piston head for operative engagement with the main cylinders bearing head and the other brake master cylinder having a spring pressed piston rod extending rearwardly beyond said rear main piston head for operative engagement with the closed end of the main piston, a brake line leading to hydraulic brakes on the trailer, conduit means connecting the brake lines to the brake master cylinders, a control valve interposed in said conduit means and movable to occupy positions in which said conduit means is out of communication with one of the brake master cylinders and in communication with the other brake master cylinder and out of communication with the other brake master cylinder and in communication with the one brake master cylinder, and operating means connected to said valve for effecting the movements of the latter, said operating means comprising an electromagnetic operator, and energizing means therefor comprising an electrical conduit connectible to the back-up light circuit of a towing vehicle.

4. In a trailer hydraulic braking mechanism, a main cylinder having a closed rear end, a bearing head closing the forward end of said main cylinder, a tongue shaft slidably traversing said bearing head and projecting forwardly beyond said bearing head, said tongue having a forward end arranged to be connected to a hitch on a towing vehicle and a rear end within said main cylinder, a main piston working in said main cylinder, said main piston comprising spaced front and rear piston heads and said rear end of the tongue being secured to said front piston head, a pair of laterally spaced brake master cylinders positioned between said front and rear piston heads, one of said brake master cylinders having a spring projected piston rod extending forwardly beyond said front piston head for operative engagement with the main cylinders bearing head and the other brake master cylinder having a spring pressed piston rod extending rearwardly beyond said rear main piston head for operative engagement with the closed end of the main piston, a brake line leading to hydraulic brakes on the trailer, conduit means connecting the brake line to the brake master cylinders, a control valve interposed in said conduit means and movable to occupy positions in which said conduit means is out of communication with one of the brake master cylinders and in communication with the other brake master cylinder and out of communication with the other brake master cylinder and in communication with the one brake master cylinder, and operating means connected to said valve for effecting the movements of the latter, said conduit means further comprising an excess brake fluid tank overlying said brake master cylinders and having restricted gravity flow communication with both of said brake master cylinders.

References Cited in the file of this patent
UNITED STATES PATENTS

| | | |
|---|---|---|
| 758,059 | Geucke | Apr. 26, 1904 |
| 1,709,834 | Bragg et al. | Apr. 23, 1929 |
| 2,013,033 | Clarke | Sept. 3, 1935 |
| 2,149,188 | Shaffer | Feb. 28, 1939 |